United States Patent

Matsubara et al.

(10) Patent No.: US 10,041,587 B2
(45) Date of Patent: Aug. 7, 2018

(54) VEHICLE SYSTEM

(71) Applicant: TOYOTA JIDOSHA KABUSHIKI KAISHA, Toyota-shi, Aichi-ken (JP)

(72) Inventors: Masato Matsubara, Toyota (JP); Masato Tateno, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 117 days.

(21) Appl. No.: 15/117,892

(22) PCT Filed: Feb. 16, 2015

(86) PCT No.: PCT/IB2015/000274
§ 371 (c)(1),
(2) Date: Aug. 10, 2016

(87) PCT Pub. No.: WO2015/125012
PCT Pub. Date: Aug. 27, 2015

(65) Prior Publication Data
US 2017/0009879 A1    Jan. 12, 2017

(30) Foreign Application Priority Data

Feb. 18, 2014 (JP) ................................. 2014-028954

(51) Int. Cl.
F16H 61/12        (2010.01)
F16H 59/10        (2006.01)

(52) U.S. Cl.
CPC ........... *F16H 61/12* (2013.01); *F16H 59/105* (2013.01); *F16H 2061/1208* (2013.01)

(58) Field of Classification Search
CPC ......... F16H 61/12; F16H 59/105; F16H 59/10
See application file for complete search history.

(56) References Cited

U.S. PATENT DOCUMENTS 8,775,007 B2 * 7/2014 Shimizu .................. F16H 61/12
701/29.1
2002/0055410 A1    5/2002 Nagasaka
(Continued)

FOREIGN PATENT DOCUMENTS

CN            101235895 A      8/2008
EP             2149472 A1      2/2010
(Continued)

*Primary Examiner* — Stacey A Fluhart
(74) *Attorney, Agent, or Firm* — Oliff PLC (57) ABSTRACT

A vehicle system includes: a shift operation device including an operator, the operator being configured to be returned to an initial position when not operated by a driver, the operator being configured to be operated by the driver to an operation position corresponding to a shift position of an automatic transmission; a change mechanism configured to change the shift position by activating an actuator; and an electronic control unit configured to set a first required position on the basis of the initial position and the operation position, electrically change the shift position on the basis of the required position, hold the required position as a second required position until a new required position is set on the basis of the operation position, and, by comparing the second required position with the shift position, determine whether the vehicle system is abnormal.

4 Claims, 6 Drawing Sheets (56) References Cited

U.S. PATENT DOCUMENTS

| | | | |
|---|---|---|---|
| 2004/0200683 A1* | 10/2004 | Amamiya | F16H 61/32 |
| | | | 192/3.58 |
| 2004/0259685 A1 | 12/2004 | Inoue et al. | |
| 2008/0108480 A1 | 5/2008 | Kamada et al. | |
| 2008/0182717 A1 | 7/2008 | Shinojima et al. | |
| 2011/0257852 A1* | 10/2011 | Ishino | F16H 59/105 |
| | | | 701/51 |
| 2014/0188356 A1* | 7/2014 | Hokoi | F16H 59/08 |
| | | | 701/58 |
| 2014/0216194 A1 | 8/2014 | Lindner et al. | |

FOREIGN PATENT DOCUMENTS

| | | |
|---|---|---|
| JP | 2002-139143 A | 5/2002 |
| JP | 2005-007993 A | 1/2005 |
| JP | 2008-115944 A | 5/2008 |
| JP | 2008-184985 A | 8/2008 |
| JP | 2008-240863 A | 10/2008 |
| JP | 2011-225033 A | 11/2011 |
| WO | 2013/079274 A1 | 6/2013 |

\* cited by examiner

| | | CONTROL POSITION | | | | |
|---|---|---|---|---|---|---|
| | | P | N | D | B | R |
| REQUIRED POSITION | NOTHING | ○ | ○ | X | X | X |
| | P | ○ | ○ | X | X | X |
| | N | ○ | ○ | X | X | X |
| | D | ○ | ○ | ○ | ○ | X |
| | B | ○ | ○ | ○ | ○ | X |
| | R | ○ | ○ | X | X | ○ |

○ : NORMAL    X : ABNORMAL

FIG. 6

FIG. 7

VEHICLE SYSTEM

BACKGROUND OF THE INVENTION

1. Field of the Invention

The invention relates to a vehicle system, which electrically changes a shift position of an automatic transmission by activating an actuator.

2. Description of Related Art

There is well-known a vehicle including a change mechanism that electrically changes a shift position of an automatic transmission by activating an actuator on the basis of a required position according to an operation position in a shift operation device that is artificially operated. Such a vehicle is, for example, a vehicle including a range change mechanism (which corresponds to the above change mechanism) described in Japanese Patent Application Publication No. 2008-184985 (JP 2008-184985 A). JP 2008-184985 A describes that, after a lapse of a predetermined waiting time since a target shift range (which corresponds to the above required position) has been changed through driver's range change operation, it is determined whether an actual shift range coincides with a target shift range. The predetermined waiting time is a time set so as to be longer than or equal to a delay time corresponding to a motor driving time that is taken until the actual shift range (which is synonymous with position) reaches the target shift range. JP 2008-184985 A also describes a device that changes among known four P, R, N, D shift ranges, a device that changes between only two ranges, that is, a P range and a range other than the P range (non-P range), and the like, as the range change mechanism.

SUMMARY OF THE INVENTION

Incidentally, if a momentary-type shift operation device in which an operator (for example, a shift lever or a switch) is returned to an initial position in a state where no external force is applied to the operator is provided, a required position based on an operation position corresponding to a driver's desired shift position is, for example, set only while the operator is being operated to the operation position. Therefore, there is a case where, after the required position is returned to a set position corresponding to the initial position, a change into the shift position of the automatic transmission, corresponding to the required position based on the operation position, completes. In such a case, the required position corresponding to the initial position does not coincide with the shift position of the automatic transmission at the time when the change has completed. Thus, although it is normal change operation into the driver's desired shift position, there is a concern erroneous abnormality determination is made. The above-described problem is not publicly known.

The invention provides a vehicle system, which, when a shift operation device is of a momentary type, is able to prevent erroneous abnormality determination in comparing a required position with a shift position.

A first aspect of the invention provides a vehicle system. The vehicle system includes a shift operation device including an operator, the operator being configured to be returned to an initial position when not operated by a driver, the operator being configured to be operated by the driver to an operation position corresponding to a shift position of an automatic transmission; a change mechanism configured to change the shift position of the automatic transmission by activating an actuator; and an electronic control unit. The electronic control unit is configured to set a first required position based on the initial position and the operation position. The electronic control unit is configured to electrically change the shift position of the automatic transmission based on the first required position. The electronic control unit is configured to hold the first required position as a second required position until a new required position is set based on the operation position. The electronic control unit is configured to determine whether or not the vehicle system is abnormal by comparing the second required position with the shift position of the automatic transmission.

According to the above aspect, for example, because a change of the shift position of the automatic transmission based on a change of the required position resulting from operation of the operator accompanies a change that is carried out by the change mechanism, when the operator is returned from any one of the operation positions to the initial position in the shift operation device and then the shift position of the automatic transmission is changed to the shift position corresponding to the operation position, the required position according to the position of the operator is set to the required position based on the initial position. However, because the second required position is set to the required position according to the operation position to which the operator has been operated just before, erroneous abnormality determination is prevented in comparing the second required position with the shift position in the case where the shift operation device is of a momentary type.

In the above aspect, the operation position may include a non-travel position corresponding to a non-traveling position of the automatic transmission and a travel position corresponding to a traveling position of the automatic transmission. The electronic control unit may be configured to, when (i) the shift position of the automatic transmission is the traveling position and (ii) the second required position is one of the non-traveling position and a required position based on the initial position, determine that the vehicle system is abnormal. According to the above aspect, because a change of the shift position of the automatic transmission to the traveling position based on a change of the required position to the traveling position resulting from operation of the operator accompanies a change that is carried out by the change mechanism, when the operator is returned from the travel position corresponding to the traveling position to the initial position in the shift operation device and then the shift position of the automatic transmission is changed to the traveling position, the required position according to the position of the operator is set to the required position based on the initial position. However, the second required position is set to the traveling position, so erroneous abnormality determination is prevented.

In the above aspect, the electronic control unit may be configured to, when (i) the shift position of the automatic transmission is the traveling position and (ii) the second required position is the traveling position of which a traveling direction is opposite to a traveling direction of the shift position, determine that the vehicle system is abnormal. According to the above aspect, by determining that the vehicle system is abnormal when the shift position is controlled in the traveling direction opposite to the traveling direction desired by the driver, it is possible to execute fail-safe process.

In the above aspect, the electronic control unit may be configured to, when (i) the shift position of the automatic transmission is the non-traveling position and (ii) the second required position is one of the non-traveling position, the traveling position and the required position based on the initial position, determine that the vehicle system is normal. According to the above aspect, because a change of the shift position of the automatic transmission from the non-traveling position to the travel position based on a change of the required position from the non-traveling position to the traveling position resulting from operation of the operator accompanies a change that is carried out by the change mechanism, when the operator is returned from the travel position corresponding to the traveling position to the initial position in the shift operation device and then the shift position of the automatic transmission is changed from the non-traveling position to the traveling position, the shift position is set to the non-traveling position in the change process, so erroneous abnormality determination is prevented.

In the above aspect, the electronic control unit may be configured to, by comparing the second required position with the shift position, determine whether or not a state of the vehicle system there is an abnormal state, and the electronic control unit may be configured to, when a duration of the abnormal state is longer than or equal to a predetermined time, determine that the vehicle system is abnormal. According to the above aspect, by comparing the required position with the shift position, it is possible to reliably determine that the vehicle system is abnormal.

In the above aspect, the change mechanism may be a change mechanism configured to change by activating an actuator between a locked state in which a lock tooth engages with rotary teeth rotating together with a wheel and a single or plurality of non-locked states in which the locked state is released. Particularly, the change mechanism may be a parking lock device configured to change between the locked state and the single non-locked state by operating the actuator. The electronic control unit may be configured to set the shift position of the automatic transmission to a park position by setting the locked state. The park position is a position at which a power transmission path in the automatic transmission is interrupted and rotation of the wheel is mechanically blocked by the parking lock device. The electronic control unit may be configured to change the shift position of the automatic transmission to any one of a neutral position, a reverse traveling position and a forward traveling position by setting the non-locked state. The neutral position is a position for setting a neutral state in which the power transmission path in the automatic transmission is interrupted. The reverse traveling position is a position for causing the vehicle to travel backward. The forward traveling position is a position for causing the vehicle to travel forward. According to the above aspect, for example, because a change of the shift position of the automatic transmission based on a change of the required position resulting from operation of the operator accompanies a change that is carried out by the change mechanism between the locked state and the non-locked state, when the operator is returned from any one of the operation positions to the initial position in the shift operation device and then the shift position of the automatic transmission is changed to the shift position corresponding to the operation position, the required position according to the position of the operator is the required position based on the initial position. However, because the second required position is set to the required position according to the operation position to which the operator has been operated just before, erroneous abnormality determination is prevented in comparing the required position with the shift position in the case where the shift operation device is of a momentary type. According to the above aspect, because a change of the shift position of the automatic transmission from the traveling position to the park position based on a change of the required position from the traveling position to the park position resulting from operation of the operator accompanies a change that is carried out by the change mechanism, when the operator is returned from the travel position corresponding to the park position to the initial position in the shift operation device and then the shift position of the automatic transmission is changed from the traveling position to the park position, the shift position is set to the neutral position that is one of the non-traveling positions in the change process, so erroneous abnormality determination is prevented.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the invention will be described in detail with reference to the accompanying drawings.

Figure 1:
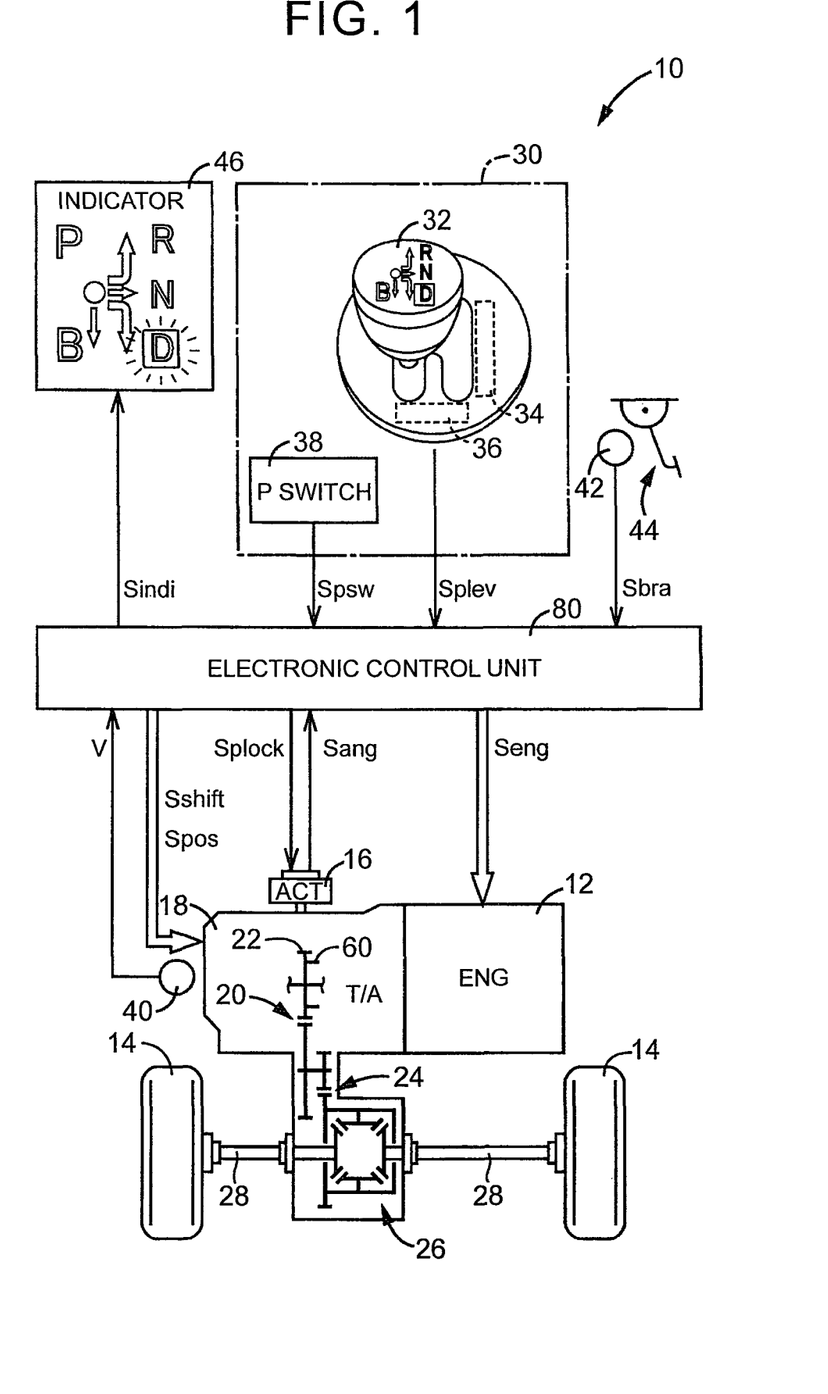
FIG. 1 is a view that illustrates the schematic configuration of a vehicle to which the invention is applied, and is a block diagram that illustrates a relevant portion of a control system provided in the vehicle.

FIG. 1 is a view that illustrates the schematic configuration of a power transmission path from an engine 12 to drive wheels 14, which constitute a vehicle 10 (a vehicle system) to which the invention is applied. FIG. 1 is a block diagram that illustrates a relevant portion of a control system provided in the vehicle 10 in order to control a change mechanism 16, and the like. As shown in FIG. 1, the vehicle 10 includes the change mechanism 16, an automatic transmission 18, and the like. The vehicle 10 employs a shift-by-wire (SBW) system in which a shift position (which is synonymous with a range) of the automatic transmission 18 is changed through electric control. The automatic transmission 18, for example, transmits the power of the engine 12 from an output gear 22 to the pair of drive wheels 14 sequentially via a counter gear pair 20, a final gear pair 24, a differential gear 26, a pair of drive shafts 28, and the like.

The output gear 22 serves as an output rotating member of the automatic transmission 18. The engine 12 is an internal combustion engine that serves as a driving force source for propelling the vehicle 10. The output gear 22 constitutes one of the counter gear pair 20. These automatic transmission 18, counter gear pair 20, final gear pair 24, differential gear 26, and the like, constitute a transaxle that serves as a drive line. The vehicle 10 further includes a shift operation device 30.

The vehicle 10 includes an electronic control unit 80. The electronic control unit 80 includes a shift change controller for the vehicle 10. The shift change controller controls a change of the operation state of the change mechanism 16, a change of the shift position of the automatic transmission 18, or the like. The electronic control unit 80 includes a so-called microcomputer. The microcomputer includes, for example, a CPU, a RAM, a ROM, an input/output interface, and the like. The CPU executes various controls over the vehicle 10 by carrying out signal processing in accordance with a program prestored in the ROM while utilizing the temporary storage function of the RAM. For example, the electronic control unit 80 is configured to execute vehicle control, such as output control over the engine 12, shift control over the automatic transmission 18, change control over the shift position of the automatic transmission 18 using the shift-by-wire system, and change control over the operation state of the change mechanism 16. The electronic control unit 80 is split into a unit for output control over the engine 12, a unit for shift control over the automatic transmission 18, and the like, as needed. Various signals detected by various sensors provided in the vehicle 10 are supplied to the electronic control unit 80. The various sensors include, for example, a shift sensor 34, a select sensor 36, a P switch 38, a vehicle speed sensor 40, a brake switch 42, an encoder 52 (see FIG. 3), and the like. The shift sensor 34 and the select sensor 36 are operation position sensors of a shift lever 32. The various signals include, for example, a shift lever position signal Splev, a P switch signal Spsw, a vehicle speed signal, a brake operation signal Sbra, a rotation signal Sang, and the like. The shift lever position signal Splev is an operation signal corresponding to an operation position (lever position) Plev of the shift lever 32. The P switch signal Spsw is an operation signal corresponding to an operation position (P switch on position) Psw at the time when the P switch 38 is operated. The vehicle speed signal indicates the vehicle speed V corresponding to an output rotation speed of the automatic transmission 18. The brake operation signal Sbra indicates a brake on state in which a foot brake pedal 44 that is a service brake is operated. The rotation signal Sang indicates a rotation angle of a P lock drive motor 50 (see FIG. 3), which is a position signal in the change mechanism 16. Various output signals are supplied from the electronic control unit 80 to the devices (for example, the engine 12, the change mechanism 16, the automatic transmission 18, and the like) provided in the vehicle 10. The various output signals include, for example, an engine output control command signal Seng, a P change control command signal Splock, a shift control command signal Sshift, a shift position change control command signal Spos, a shift position indication signal Sindi, and the like. The engine output control command signal Seng is used to execute output control over the engine 12. The P change control command signal Splock is used to execute change control over the change mechanism 16. The shift control command signal Sshift is used to execute shift control over the automatic transmission 18. The shift position change control command signal Spos is used to change the shift position of the automatic transmission 18. The shift position indication signal Sindi is used to indicate the shift position (including the P position) of the automatic transmission 18 by activating an indicator 46.

Figure 2:
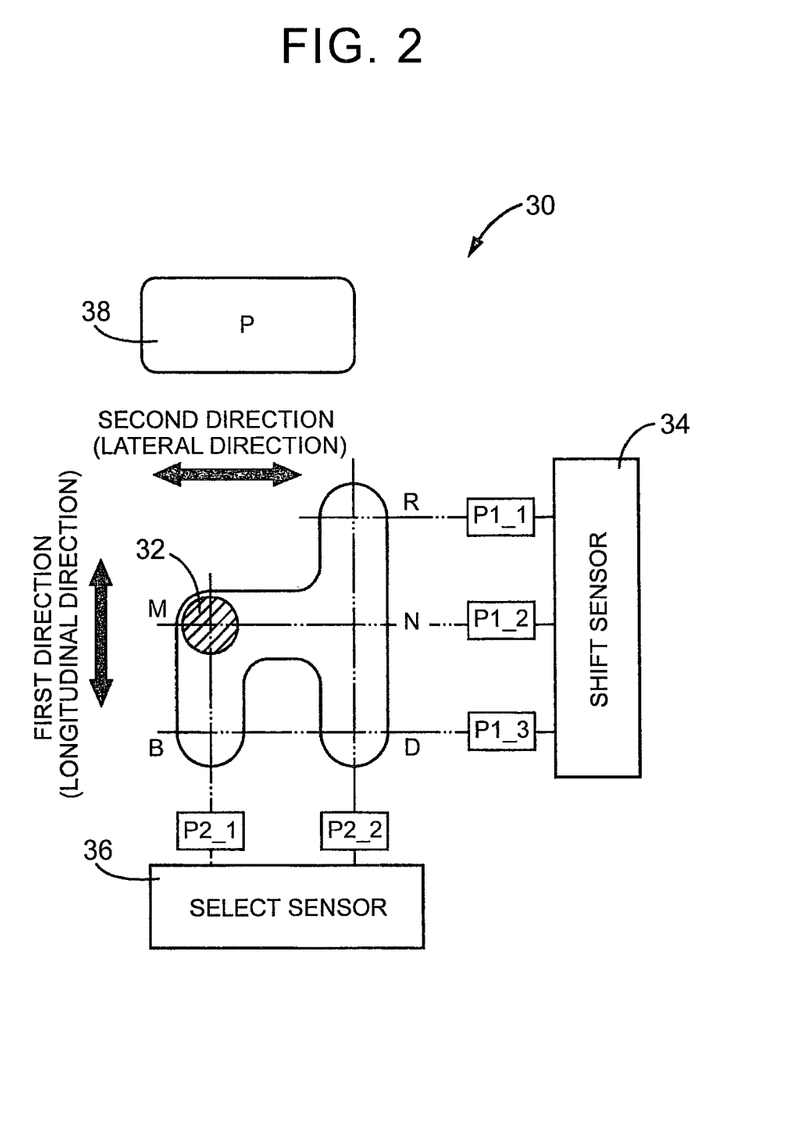
FIG. 2 is a view that shows an example of a shift operation device that changes a shift position of an automatic transmission through artificial operation.

FIG. 2 is a view that shows an example of the shift operation device 30 that serves as a change device (operation device) that is used to change among a plurality of shift positions in the automatic transmission 18 through artificial operation. The shift operation device 30 is, for example, arranged near a driver seat. The shift operation device 30 includes the shift lever 32 and the P switch 38 as operators that are selectively operated by a driver into a plurality of operation positions (the lever positions Plev and the P switch on position Psw) corresponding to the plurality of shift positions of the automatic transmission 18. Each of the shift lever 32 and the P switch 38 is a momentary-type operator that is returned to an original position (initial position) in a state where no external force is applied. That is, the momentary-type operator is an operator that is returned to the initial position when not operated by the driver. In other words, the momentary-type operator is an automatic return operator that automatically returns to the initial position when operation force is released. The shift lever 32 is alternatively operated into the plurality of lever positions Plev by the driver in order to set the shift position of the automatic transmission 18 to a desired shift position (R, N or D position) other than a parking position (P position). The P switch 38 is an operator provided as another switch near the shift lever 32. The P switch 38 is operated by the driver in order to activate parking lock by setting the shift position of the automatic transmission 18 to the P position.

As shown in FIG. 2, the shift lever 32 is configured to be operated into R operation position, N operation position, D operation position, M operation position or B operation position. The R operation position, the N operation position and the D operation position are three lever positions Plev arranged in a front-to-rear direction or up-and-down direction (that is, longitudinal direction) of the vehicle. The M operation position and the B operation position are arranged parallel to the above three lever positions Plev. The shift lever 32 outputs the shift lever position signal Splev corresponding to the lever position Plev to the electronic control unit 80. The shift lever 32 is operable in the longitudinal direction among the R operation position, the N operation position and the D operation position. The shift lever 32 is operable in the longitudinal direction between the M operation position and the B operation position. The shift lever 32 is operable in a lateral direction of the vehicle, which is perpendicular to the above longitudinal direction, between the M operation position and the B operation position. The M operation position is the initial position (home position) of the shift lever 32. Even when the shift lever 32 has been shifted into any one of the lever positions Plev (R, N, D and B operation positions) other than the M operation position, but when the driver releases the shift lever 32 (that is, when external force applied to the shift lever 32 disappears), the shift lever 32 returns to the M operation position owing to a mechanical mechanism, such as a spring.

The P switch 38 is, for example, a momentary-type pushbutton switch. The P switch 38 outputs a P switch signal Spsw to the electronic control unit 80 each time the P switch 38 is depressed by the driver to the P operation position that is the P switch on position Psw. When the P switch 38 is not depressed, the P switch 38 is placed at the initial position (home position). Even when the P switch 38 has been depressed to the P switch on position Psw, but when the driver releases the P switch 38, the P switch 38 is configured to return to the initial position by a mechanical mechanism, such as a spring.

At the time when the shift operation device 30 is operated into any one of the operation positions, the shift position of the automatic transmission 18 is changed by the electronic control unit 80 into the shift position corresponding to the any one of the operation positions based on the operation signal corresponding to the any one of the operation positions. At the time when the shift operation device 30 is operated into any one of the operation positions, the current operation position, that is, the state of the shift position of the automatic transmission 18, is indicated on the indicator 46.

Each of the shift positions (P, R, N and D positions) of the automatic transmission 18 will be described. The P position is a park position at which the power transmission path in the automatic transmission 18 is interrupted and parking lock (P lock) that mechanically blocks rotation of the drive wheels 14 is activated by the change mechanism 16. The P position is selected as a result of depression of the P switch 38 to the P switch on position Psw. The R position is a reverse traveling position in which driving force for causing the vehicle to travel backward is transmitted to the drive wheels (that is, reverse traveling position for causing the vehicle 10 to travel backward). The R position is selected as a result of shifting of the shift lever 32 into the R operation position. The neutral position (N position) is a neutral position for setting a neutral state in which the power transmission path in the automatic transmission 18 is interrupted. The neutral position is selected when the shift lever 32 is shifted into the N operation position. The D position is a forward traveling position at which driving force for causing the vehicle to travel forward is transmitted to the drive wheels 14. The forward traveling position is a forward traveling position for causing the vehicle 10 to travel forward. The D position is selected as a result of shifting of the shift lever 32 into the D operation position. The B position is a decelerating forward traveling position (engine brake position) at which rotation of the drive wheels 14 is decelerated by exercising engine brake effect at the D position. The B position is selected as a result of shifting of the shift lever 32 into the B operation position.

In the shift operation device 30 according to the present embodiment, when external force that is applied to the shift lever 32 or the P switch 38 disappears, the shift lever 32 or the P switch 38 is returned to the corresponding initial position. Thus, it is not possible to recognize the selected shift position only by visually identifying the shift lever 32 or the P switch 38. Therefore, the indicator 46 is provided at an easily viewable position from the driver. The selected shift position is indicated on the indicator 46, including the case where the selected position is the P position.

A so-called shift-by-wire is employed in the vehicle 10 according to the present embodiment. As shown in FIG. 2, the shift operation device 30 is two-dimensionally shifted in a first direction P1 and a second direction P2. The first direction P1 is the above-described longitudinal direction. The second direction P2 is the lateral direction that intersects with (that is, perpendicular to) the first direction P1. Therefore, the shift operation device 30 includes the shift sensor 34 and the select sensor 36 as position sensors for detecting the lever position Plev of the shift lever 32. The shift sensor 34 serves as a first direction detection unit that detects shift operation in the first direction P1. The select sensor 36 serves as a second direction detection unit that detects shift operation in the second direction P2. Each of the shift sensor 34 and the select sensor 36 outputs a voltage to the electronic control unit 80 as the shift lever position signal Splev corresponding to the lever position Plev. That is, the shift sensor 34 and the select sensor 36 as a whole constitute a lever position detection unit that detects the lever position Plev. The electronic control unit 80 recognizes (determines) the lever position Plev on the basis of the voltage of the shift lever position signal Splev.

An example of recognition of the lever position Plev will be described. A detection signal voltage VSF of the shift sensor 34 has a voltage level corresponding to any one of a first direction first position P1_1, a first direction second position P1_2, and a first direction third position P1_3 (any one of a voltage that falls within a low range, a voltage that falls within a mid range and a voltage that falls within a high range). The first direction first position P1_1 indicates the R operation position. The first direction second position P1_2 indicates the M operation position or the N operation position. The first direction third position P1_3 indicates the B operation position or the D operation position. A detection signal voltage VSL of the select sensor 36 has a voltage level corresponding to one of a second direction first position P2_1 and a second direction second position P2_2 (one of a voltage that falls within a low range and a voltage that falls within a high range). The second direction first position P2_1 indicates the M operation position or the B operation position. The second direction second position P2_2 indicates the R operation position, the N operation position or the D operation position. The electronic control unit 80 recognizes the lever position Plev (R, N, D, M or B operation position) in accordance with a combination of the voltage levels by detecting the detection signal voltages VSF, VSL that change in this way.

Figure 3:
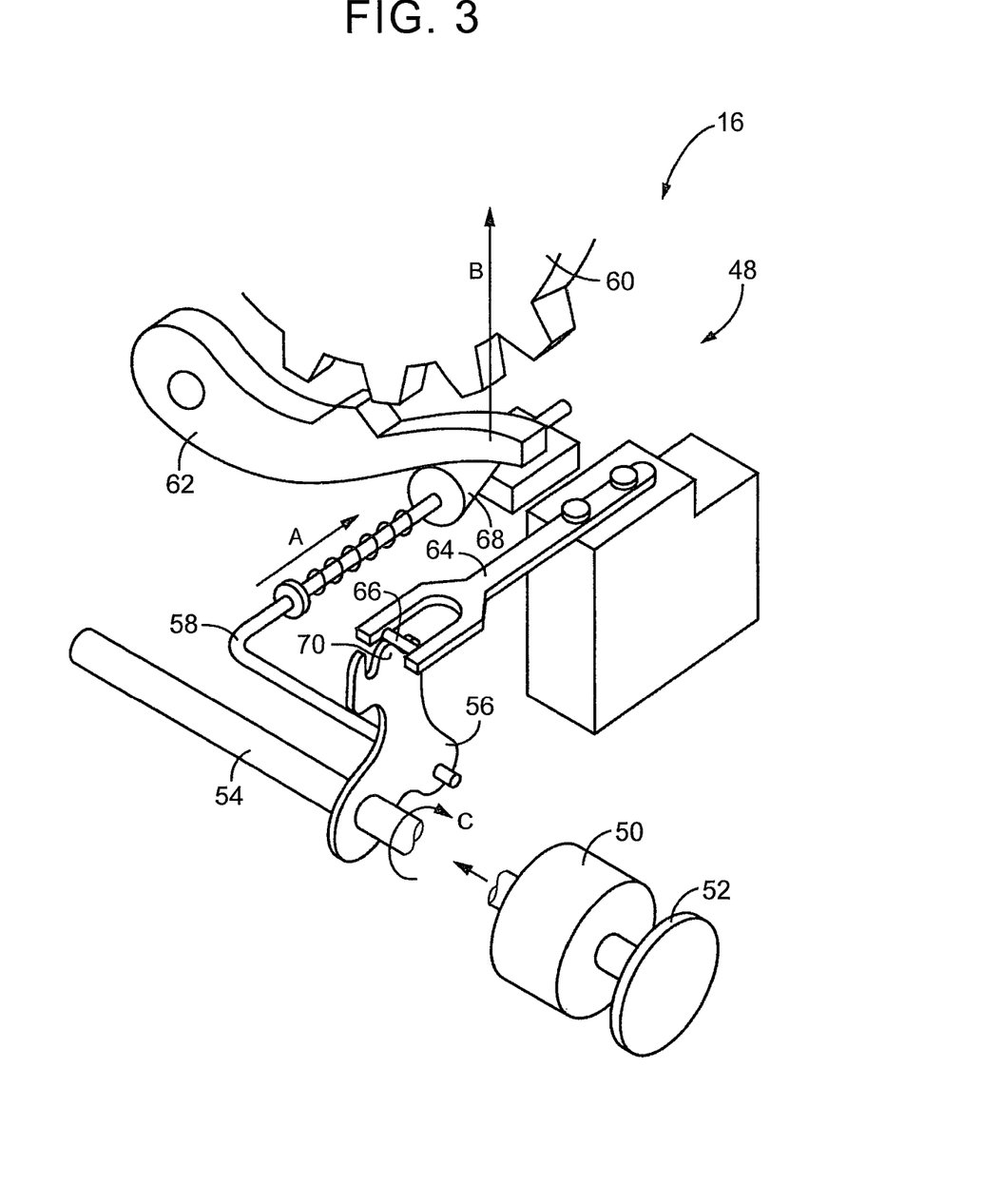
FIG. 3 is a perspective view that shows an example of a change mechanism that mechanically blocks rotation of drive wheels.

FIG. 3 is a perspective view that illustrates the configuration of the change mechanism 16 that activates P lock for mechanically fixing rotation of the output gear 22 of the automatic transmission 18 (that is, mechanically blocking rotation of the drive wheels 14). As shown in FIG. 3, the change mechanism 16 includes a P lock mechanism 48, the P lock drive motor 50, the encoder 52, and the like. The change mechanism 16 prevents movement of the vehicle 10 or permits movement of the vehicle 10 on the basis of a control signal from the electronic control unit 80.

The P lock drive motor 50 is, for example, formed of a switched reluctance motor (SR motor). The P lock drive motor 50 is an actuator that drives the P lock mechanism 48 through a shift-by-wire system upon reception of a command (control signal) from the electronic control unit 80. The encoder 52 is a rotary encoder that outputs an A-phase signal, a B-phase signal and a Z-phase signal. The encoder 52 rotates integrally with the P lock drive motor 50, detects a rotation condition of the SR motor, and outputs a signal indicating the rotation condition to the electronic control unit 80. The signal is a pulse signal for acquiring a counted value (encoder count) corresponding to a displacement (rotation amount) of the P lock drive motor 50. The electronic control unit 80 grasps the rotation condition of the SR motor by acquiring a signal that is supplied from the encoder 52, and executes energization control for driving the SR motor.

The P lock mechanism 48 includes a shaft 54, a detent plate 56, a rod 58, a parking gear 60, a parking lock pawl 62, a detent spring 64, a roller 66, and the like. The shaft 54 is rotationally driven by the P lock drive motor 50. The detent plate 56 rotates with rotation of the shaft 54. The rod 58 operates with rotation of the detent plate 56. The parking gear 60 that is rotary teeth that rotate together with the drive wheels 14 serving as wheels (that is, rotary teeth that rotate in interlocking with the drive wheels 14). The parking lock pawl 62 is a lock tooth for blocking (locking) rotation of the parking gear 60. The detent spring 64 limits rotation of the detent plate 56.

A location of the parking gear 60 is not limited as long as there is a relationship that, when the parking gear 60 is set to a locked state, the drive wheels 14 are also set to a locked state. For example, the parking gear 60 is fixed concentrically with the output gear 22 of the automatic transmission 18 (see FIG. 1). The detent plate 56 is operably coupled to a drive shaft of the P lock drive motor 50 via the shaft 54. The detent plate 56 is driven by the P lock drive motor 50 together with the rod 58, the detent spring 64, the roller 66, and the like, and functions as a parking lock position determining member for changing between a parking lock position and a non-parking lock position. The parking lock position corresponds to the P position. The non-parking lock position corresponds to a non-P position that is any one of the shift positions (R, N, D and B positions) other than the P position.

FIG. 3 shows a state at the non-parking lock position. In this state, because it is not the locked state where the parking lock pawl 62 engages with the parking gear 60, the P lock mechanism 48 does not interfere with rotation of the drive wheels 14. When the shaft 54 is rotated by the P lock drive motor 50 in the arrow, C direction shown in FIG. 3 from this state, the rod 58 is pressed in the arrow A direction shown in FIG. 3 via the detent plate 56. As a result, the parking lock pawl 62 is pushed upward in the arrow B direction shown in FIG. 3 by a tapered member 68 provided at the distal end of the rod 58. With rotation of the detent plate 56, the roller 66 of the detent spring 64 at one (that is, the non-parking lock position) of two concave portions provided at the top of the detent plate 56 climbs over a convex portion 70 and shifts into the other concave portion (that is, the parking lock position). The roller 66 is provided on the detent spring 64 so as to be rotatable about the axis of the roller 66. When the detent plate 56 rotates such that the roller 66 is located at the parking lock position, the parking lock pawl 62 is pushed upward to a position at which the parking lock pawl 62 engages with the parking gear 60. Thus, rotation of the drive wheels 14 that rotate in interlocking with the parking gear 60 is mechanically blocked, and the shift position of the automatic transmission 18 is set to the P position.

In this way, the change mechanism 16 is a change mechanism that changes the shift position of the automatic transmission 18 by operating the P lock drive motor 50 on the basis of driver's operation (in other words, in accordance with the shift lever position signal Splev or the P switch signal Spsw). The change mechanism 16 is a parking lock device that changes by operating the P lock drive motor between a locked state (parking lock position) and a non-locked state (non-parking lock position). In the locked state, the parking lock pawl 62 engages with the parking gear 60. In the non-locked state, the locked state is released. Instead of setting the drive wheels 14 in a non-rotatable state (locked state), movement of the vehicle 10 may be prevented by setting driven wheels (not shown), similarly serving as wheels, to a non-rotatable state. In such a case, the change mechanism 16 is configured to change rotary teeth, which rotate together with the driven wheels, between the locked state and the non-locked state on the basis of driver's operation.

Figure 4:
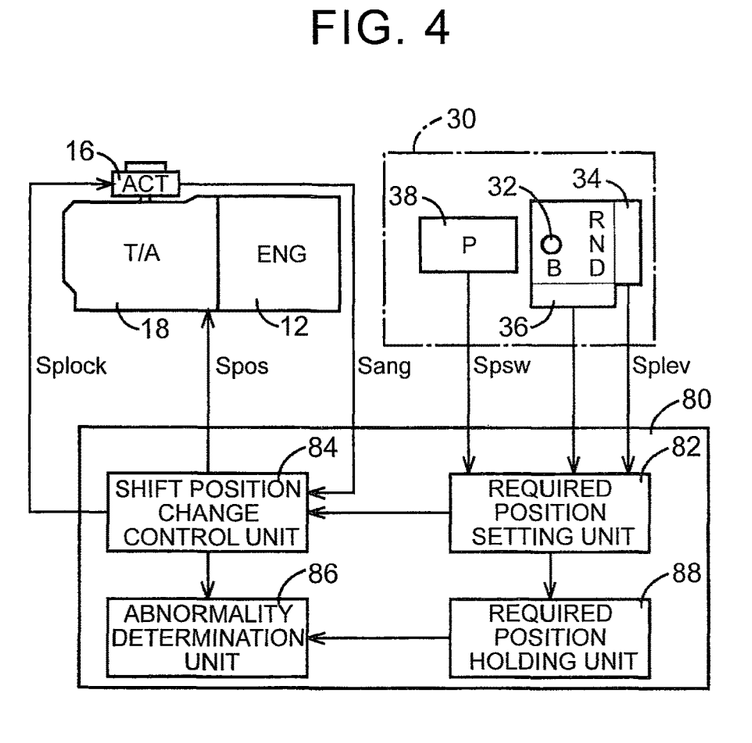
FIG. 4 is a functional block diagram that illustrates a relevant portion of control functions of an electronic control unit.

FIG. 4 is a functional block diagram that illustrates a relevant portion of control functions of the electronic control unit 80. As shown in FIG. 4, the electronic control unit 80 functionally includes a required position setting unit 82, a shift position change control unit 84 and an abnormality determination unit 86. The required position setting unit 82 is one example of required position setting means. The shift position change control unit 84 is one example of shift position change control means. The abnormality determination unit 86 is one example of abnormality determination means.

The required position setting unit 82 sets a required position based on, for example, the initial positions and the operation position in the shift operation device 30. The required position is the shift position of the automatic transmission 18, which is desired by the driver. Specifically, when the required position setting unit 82 determines, on the basis of the shift lever position signal Splev and the P switch signal Spsw, that both the shift lever 32 and the P switch 38 are located at the corresponding initial positions, the required position setting unit 82 sets the required position to "nothing". Until the shift lever 32 or the P switch 38 is returned to the initial position after being continuously kept at any one of the operation positions (at any one of the lever positions Plev or at the P switch on position Psw) for a predetermined time A or longer on the basis of the shift lever position signal Splev or the P switch signal Spsw, the required position setting unit 82 sets the required position to the shift position corresponding to the operation position. The predetermined time A is, for example, an operation determination threshold obtained and stored in advance by a design or an experiment (that is, determined in advance) as a time by which it may be determined that the shift lever 32 or the P switch 38 has been definitely operated into an operation position by driver's intention. The predetermined time A may be set to a uniform value for the operation positions or may be set to different values for the operation positions.

The shift position change control unit 84, for example, electrically changes the shift position of the automatic transmission 18 on the basis of the required position set by the required position setting unit 82. That is, the shift position change control unit 84 changes into the shift position corresponding to the required position. Specifically, the shift position change control unit 84 determines, on the basis of the rotation signal Sang indicating the rotation angle of the P lock drive motor 50, whether the parking gear 60 is in the locked state or the non-locked state. To indicate the rotation angle of the P lock drive motor 50 is to indicate the activation state of the parking lock in the change mechanism 16. The change control unit 84 determines whether the shift position of the automatic transmission 18 is the P position or the non-P position. When the P position is set by the required position setting unit 82 as the required position at the time when the parking gear 60 is in the non-locked state (that is, when the shift position is in the non-P position), the shift position change control unit 84 sets the parking gear 60 to the locked state by operating the change mechanism 16. Thus, the shift position change control unit 84 changes the shift position of the automatic transmission 18 from the non-P position to the P position. On the other hand, when any one of the non-P positions is set by the required position setting unit 82 as the required position at the time when the parking gear 60 is in the locked state, the shift position change control unit 84 sets the parking gear 60 to the non-locked state by operating the change mechanism 16. Thus, the shift position change control unit 84 changes the shift position of the automatic transmission 18 from the P position to the any one of the non-P positions. The shift position change control unit 84 changes into any one of the shift positions, that is, the R position, the N position and the D position, corresponding to the required position. The time when the parking gear 60 is in the locked state is the time when the shift position is the P position. The non-P position is any one of the R, N and D positions (see a reject function (described later)).

In the present embodiment, the shift-by-wire (SBW) system that changes the shift position of the automatic transmission 18 through electric control is employed. Thus, the shift position change control unit 84 has the reject function (or fail-safe function) of not accepting a change of the shift position (that is, electrically prohibiting change operation of the change mechanism 16) even when the shift operation device 30 is operated by the driver. Specifically, even when the required position is set to the P position while the vehicle is traveling at the vehicle speed V that exceeds a P lock permission vehicle speed Vp, the shift position change control unit 84 does not change the shift position into the P position but sets the shift position to the N position. Even when the required position is set to any one of the non-P positions at the time when the shift position is the P position in a state where the foot brake pedal 44 is not depressed, the shift position change control unit 84 keeps the P position. The state where the foot brake pedal 44 is not depressed is a state where the brake operation signal Sbra indicating a brake on state is not output. The B position is an engine brake position predicted on that the shift position is changed from the D position to the B position. Thus, even when the required position is set to the B position at the shift position other than the D position, the shift position change control unit 84 does not change the shift position to the B position. For example, even when the required position is set to the B position at the time when the shift position is the P position, the shift position change control unit 84 keeps the P position. Even when the required position is set to the B position at the time when the shift position is the R or N position, the shift position change control unit 84 sets the shift position to the N position. Even when the required position is set to the R position while the vehicle is traveling at a vehicle speed over a predetermined vehicle speed at the time when the shift position is the D position, the shift position change control unit 84 sets the shift position to the N position. Even when the required position is set to the D position while the vehicle is traveling at a vehicle speed over the predetermined vehicle speed at the time when the shift position is the R position, the shift position change control unit 84 sets the shift position to the N position.

The abnormality determination unit 86, for example, determines whether the vehicle system is normal or abnormal by comparing the required position with the actual shift position of the automatic transmission 18. The actual shift position of the automatic transmission 18 is, for example, a shift position controlled by the shift position change control unit 84 (that is, a command value that the shift position change control unit 84 outputs). The actual shift position of the automatic transmission 18 is referred to as control position in the present embodiment. The abnormality is, for example, such an abnormality that the required position does not coincide with the control position. More specifically, the abnormality is, for example, an abnormality of shift position change control that is executed by the shift position change control unit 84. When the abnormality determination unit 86 determines that it is abnormal, predetermined fail-safe operation is, for example, executed.

Basically, when the required position coincides with the control position, the abnormality determination unit 86 determines that the vehicle system is normal. On the other hand, when the required position does not coincide with the control position, the abnormality determination unit 86 determines that the vehicle system is abnormal. However, when the control position is a non-traveling position that is the shift position (the P or N position) at which transmission of power to the drive wheels 14 is interrupted, because no force for moving the vehicle 10 is generated, the abnormality determination unit 86 determines that the vehicle system is normal even when the control position does not coincide with the required position. The D position and the B position each are the forward traveling position. Thus, between the D position and the B position, even when the control position does not coincide with the required position, it is determined to be normal. The P operation position and the N operation position each are the non-travel position corresponding to the non-traveling position of the automatic transmission 18. The R operation position, the D operation position and the B operation position each are the travel position corresponding to the traveling position of the automatic transmission 18, which is the shift position (R, D or B position) at which transmission of power to the drive wheels 14 is enabled.

Figure 5:
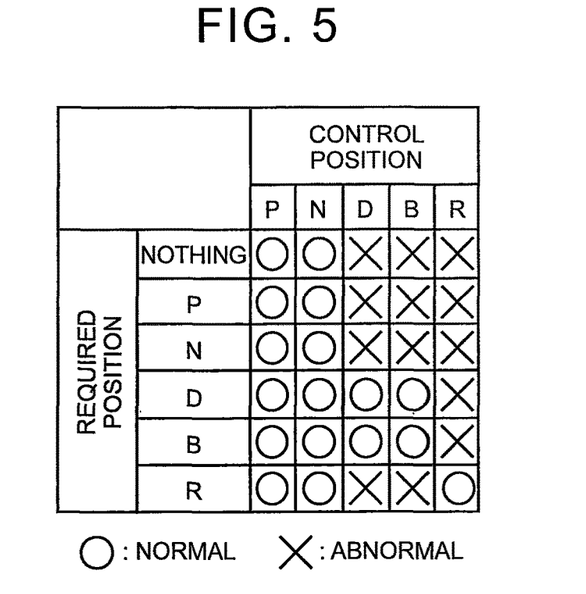
FIG. 5 is a summarized table as to whether it is determined to be normal or abnormal when a required position and a control position are compared with each other.

FIG. 5 is a summarized table as to whether it is determined to be normal or abnormal when the required position is compared with the control position in consideration of the above-described viewpoint. As shown in FIG. 5, when the control position is one of the traveling positions (R, D and B positions) and when the required position is any one of "nothing" and the non-traveling positions (P and N positions), the abnormality determination unit 86 determines that it is abnormal. When the control position is one of the traveling positions and when the required position is one of the traveling positions of which the traveling direction is opposite to the traveling direction of the control position, the abnormality determination unit 86 determines that the vehicle system is abnormal. Thus, when the control position is one of the traveling positions and when the required position is one of the traveling positions of which the traveling direction is the same as the traveling position of the control position, the abnormality determination unit 86 determines that the vehicle system is normal. On the other hand, when the control position is any one of the non-traveling positions and when the required position is any one of "nothing", the non-traveling positions and the traveling positions, the abnormality determination unit 86 determines that the vehicle system is normal. The abnormality determination unit 86 may use the table of FIG. 5 when the abnormality determination unit 86 determines whether the vehicle system is normal or abnormal at the time when the control position has changed.

Incidentally, a change of the shift position between the P position and any one of the non-P positions accompanies change operation of the change mechanism 16. In this case, the control position is determined (changed) after the change operation of the change mechanism 16 has completed (that is, after the operation period of the P lock drive motor has elapsed). In this case, at the timing at which the control position has been changed, the required position may be already "nothing". Therefore, although it is a normal position change operation into the shift position corresponding to the required position, there is a concern that it is erroneously determined to be abnormal.

Therefore, the electronic control unit 80 further functionally includes a required position holding unit 88 that is one example of required position holding means. The required position holding unit 88, for example, holds the required position set by the required position setting unit 82 until a new required position is set by the required position setting unit 82 on the basis of the operation position. That is, when the required position has changed on the basis of the operation position, the held required position is also changed accordingly. However, when the required position has changed to "nothing" on the basis of the initial positions, the held required position is not changed. For example, when the required position has been changed to the D position, the held required position is also changed to the D position. However, when the required position has been changed from the D position to "nothing", the held required position is continuously held at the D position. In the present embodiment, the required position held by the required position holding unit 88 is referred to as second required position.

The abnormality determination unit 86, for example, sets not the required position set by the required position setting unit 82 but the second required position for the required position at the time when it is determined whether the vehicle system is normal or abnormal by comparing the required position with the control position. That is, the abnormality determination unit 86 determines whether the vehicle system is abnormal by comparing the second required position with the control position. Specifically, the abnormality determination unit 86 determines whether a state of the vehicle system is an abnormal state by comparing the second required position with the control position. When the abnormality determination unit 86 determines that the state of the vehicle system is an abnormal state, the abnormality determination unit 86 determines whether the duration of the abnormal state is longer than or equal to a predetermined time B. When the abnormality determination unit 86 determines that the duration of the abnormal state is longer than or equal to the predetermined time B, the abnormality determination unit 86 determines that the vehicle system is abnormal (that is, finally determines that it is abnormal). The predetermined time B is, for example, an abnormality determination threshold determined in advance as the duration of the state where it may be definitely determined (finally determined) to be abnormal.

Figure 6:
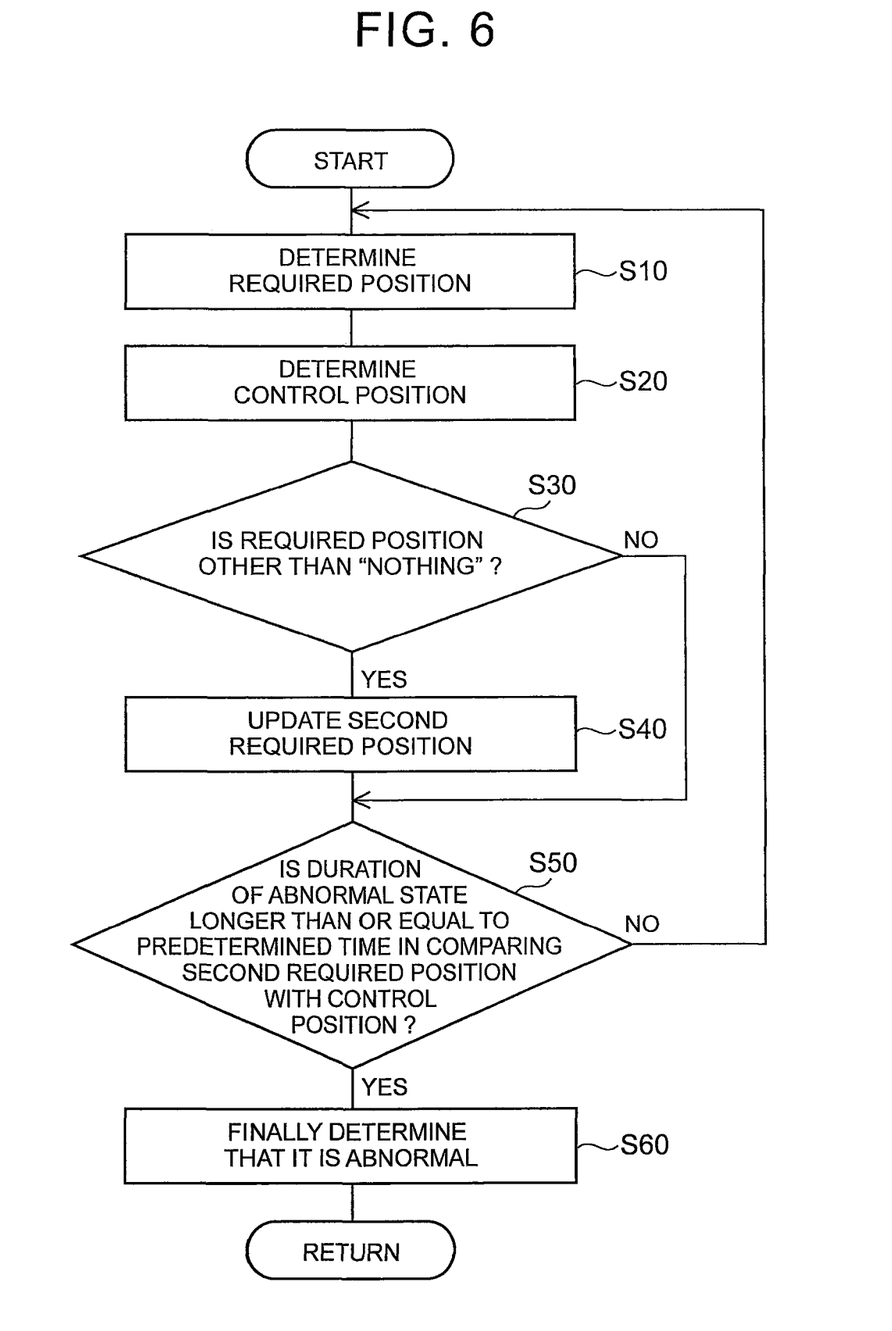
FIG. 6 is a flowchart that illustrates a relevant portion of control operations of the electronic control unit, that is, control operations for preventing erroneous abnormality determination as being abnormal in comparing the required position with the control position in the case where the shift operation device is of a momentary type.
Figure 7:
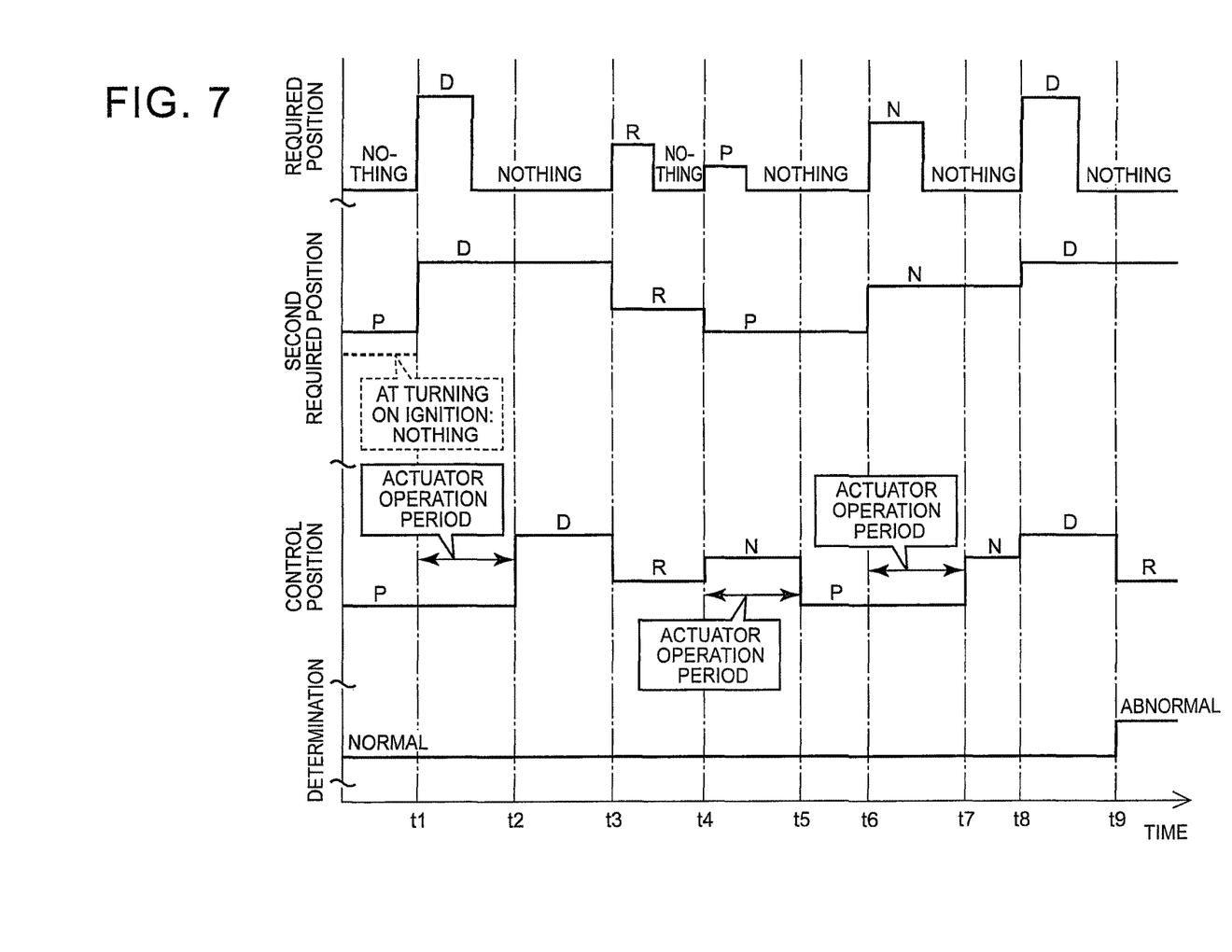
FIG. 7 is an example of a time chart in the case where the control operations shown in the flowchart of FIG. 6 are executed.

FIG. 6 is a flowchart that illustrates a relevant portion of control operations of the electronic control unit 80, that is, control operations for preventing erroneous abnormality determination in comparing the required position with the control position in the case where the shift operation device 30 is of a momentary type. The flowchart is, for example, repeatedly executed at an extremely short cycle time of about several milliseconds to several tens of milliseconds. FIG. 7 is an example of a time chart in the case where the control operations shown in the flowchart of FIG. 6 are executed.

As shown in FIG. 6, initially, in step (hereinafter, step is omitted) S10 corresponding to the required position setting unit 82, for example, the required position is set (determined) on the basis of the initial positions and the operation position in the shift operation device 30. Subsequently, in S20 corresponding to the shift position change control unit 84, for example, the shift position of the automatic transmission 18 is changed on the basis of the required position set in S10, and the control position is finally determined (determined). Subsequently, in S30 corresponding to the required position holding unit 88, for example, it is determined whether the required position is other than "nothing". When affirmative determination is made in S30, in S40 corresponding to the required position holding unit 88, for example, when the required position set in S10 is different from the second required position, the second required position is updated with the required position set in S10. When negative determination is made in S30 or subsequent to S40, for example, it is determined in S50 corresponding to the abnormality determination unit 86 whether there is an abnormal state by comparing the second required position with the control position, and, when it is determined that there is an abnormal state, it is determined whether the duration of the abnormal state is longer than or equal to the predetermined time B. When negative determination is made in S50, the process returns to S10. When affirmative determination is made in S50, for example, it is finally determined in S60 corresponding to the abnormality determination unit 86 that it is abnormal.

When the required position is set to the D position at t1 timing in FIG. 7, the second required position is updated with the D position, and, after that, the second required position is continuously held at the D position even when the required position is set to "nothing". At t2 timing at which the operation period of the P lock drive motor for changing from the P position to the non-P position has elapsed, the control position is changed to the D position. In this way, even when the control position is changed to the D position corresponding to the required position after the required position is set to "nothing", the second required position is set to the D position, with the result that erroneous abnormality determination is prevented in comparing the required position with the control position. In addition, when the control position is changed from the non-traveling position (P position) to the traveling position (D position), the control position is set to the non-traveling position in the change process, with the result that erroneous abnormality determination is prevented. More specifically, when the control position is changed from the P position to the non-P position, the control position is set to the P position in the change process, with the result that erroneous abnormality determination is prevented. Subsequently, when the required position is set to the R position at t3 timing in FIG. 7, the second required position is updated with the R position. Because it is not required to change from the non-P position, so the control position is quickly changed to the R position. Subsequently, when the required position is set to the P position at t4 timing in FIG. 7, the second required position is updated with the P position. At t5 timing at which the operation period of the P lock drive motor for changing from the non-P position to the P position has elapsed, the control position is changed to the P position. Because the non-P position is kept during the operation period of the P lock drive motor, the control position is quickly changed to the N position. In this way, when the control position is changed from the non-P position to the P position, the control position is set to the N position in the change process, with the result that erroneous abnormality determination is prevented. Subsequently, when the required position is set to the N position at t6 timing in FIG. 7, the second required position is updated with the N position. At t7 timing at which the operation period of the P lock drive motor for changing from the P position to the non-P position has elapsed, the control position is changed to the N position. Subsequently, when the required position is set to the D position at t8 timing in FIG. 7, the second required position is updated with the D position. Because it is not required to change from the non-P position, so the control position is quickly changed to the D position. After that, the second required position is continuously held at the D position even when the required position is set to "nothing", with the result that erroneous abnormality determination is prevented. Subsequently, when there is no change in the required position and the control position is changed to the R position while the second required position is continuously held at the D position at t9 timing in FIG. 7, it is determined to be abnormal.

As described above, according to the present embodiment, a change of the control position based on a change of the required position accompanies a change that is carried out by the change mechanism 16. Therefore, when the control position is changed to the shift position corresponding to the operation position after returning from the operation position to the initial position in the shift operation device 30, the required position is set to the required position based on the initial position. However, because the second required position is set to the required position according to the operation position, erroneous abnormality determination is prevented in comparing the required position with the control position in the case where the shift operation device 30 is of a momentary type.

According to the present embodiment, a change of the control position to the traveling position based on a change of the required position to the traveling position accompanies a change that is carried out by the change mechanism 16. Therefore, when the control position is changed to the traveling position after returning from the travel position to the initial position in the shift operation device 30, the required position is set to the required position based on the initial position. However, because the second required position is the traveling position, erroneous abnormality determination is prevented.

According to the present embodiment, when the control position is controlled in the traveling direction opposite to the traveling direction desired by the driver, it is determined to be abnormal, so it is possible to execute predetermined fail-safe process.

The embodiment of the invention is described in detail with reference to the accompanying drawings; however, the invention is also applicable to other embodiments.

For example, in the above-described embodiment, when the control position is the non-traveling position (P or N position), it is determined to be normal even when the required position is any position. Thus, determination made by the abnormality determination unit 86 as to whether it is normal or abnormal may be, for example, executed at least when the required position or the control position has changed to the traveling position (R, D or B position). When the required position changes to the non-traveling position, the required position does not always need to be held and set for the second required position.

In the above-described embodiment, the shift operation device 30 includes the shift lever 32 and the P switch 38. However, the shift operation device 30 is not limited to this configuration. For example, the shift operation device 30 just needs to be an operation device that converts driver's shift intention to an electrical signal. Specifically, the shift operation device 30 just needs to be an operation device that includes operation positions, an operator and a position sensor. The operation positions include P, R, N, D operation positions, and the like, corresponding to the shift positions. The operator is a lever, a dial, or the like, that is operated into the operation positions. The position sensor electrically detects that the operator has been operated into the operation positions.

In the above-described embodiment, an example in which the invention is applied to the change mechanism 16 that selectively changes between the P position (the parking lock position, the locked state) and one non-P position (the non-parking lock position, the non-locked state) in interlocking with the pivotal motion of the detent plate 56 is described. However, the change mechanism 16 is not limited to this configuration. For example, the invention can be also applied to a change mechanism that changes the shift position of the automatic transmission 18 by operating the P lock drive motor 50 in correspondence with the shift positions, P, R, N and D positions.

In the above-described embodiment, the automatic transmission 18 is formed of a transmission only, or is formed of a torque converter and a transmission having a plurality of speed ratios, or is formed of a speed reduction mechanism and a differential mechanism in addition to the transmission, or the like. The transmission is a known planetary gear automatic transmission, a known synchromesh parallel-two-shaft transmission, a known dual clutch transmission (DCT), a known belt-type continuously variable transmission, a known traction-type continuously variable transmission, an automatic transmission that functions as an electrical continuously variable transmission, an automatic transmission that is mounted on a so-called parallel hybrid vehicle, or the like. The electrical continuously variable transmission includes a differential mechanism and a second electric motor. The differential mechanism is, for example, formed of a planetary gear train that distributes power from an engine between a first electric motor and an output shaft. The second electric motor is provided on the output shaft of the differential mechanism. The speed ratio of the electrical continuously variable transmission is electrically changed so that a major part of power from the engine is mechanically transmitted toward drive wheels through differential action of the differential mechanism, and the remaining part of power from the engine is electrically transmitted from the first electric motor to the second electric motor with the use of an electrical path. In the parallel hybrid vehicle, an electric motor is provided so as to be able to transmit power to an engine shaft, an output shaft, or the like.

The above-described embodiment is only illustrative, and the invention may be implemented in modes including various modifications or improvements on the basis of the knowledge of persons skilled in the art.

The invention claimed is:

1. A vehicle system comprising:
   a shift operation device including a shift lever, the shift lever being configured to be returned to an initial position when not operated by a driver, and the shift lever being configured to be operated by the driver to an operation position corresponding to a desired shift position of an automatic transmission;
   an actuator that is activated to change an actual shift position of the automatic transmission; and
   an electronic control unit configured to
      set a first required position based on the initial position and the operation position,
      electrically change the actual shift position based on the first required position,
      hold the first required position as a second required position until a new required position is set based on the operation position, and
      determine whether or not the vehicle system is abnormal by comparing the second required position with the actual shift position,
   wherein
      the operation position includes a non-travel position corresponding to a non-traveling position of the automatic transmission and a travel position corresponding to a traveling position of the automatic transmission, and
      the electronic control unit is configured to, when (i) the actual shift position is the traveling position and (ii) the second required position is one of the non-traveling position and a required position based on the initial position, determine that the vehicle system is abnormal.

2. The vehicle system according to claim 1, wherein the electronic control unit is configured to, when (i) the actual shift position is the traveling position and (ii) the second required position is the traveling position of which a traveling direction is opposite to a traveling direction of the actual shift position, determine that the vehicle system is abnormal.

3. The vehicle system according to claim 1, wherein the electronic control unit is configured to, when (i) the actual shift position is the non-traveling position and (ii) the second required position is any one of the non-traveling position, the traveling position and the required position based on the initial position, determine that the vehicle system is normal.

4. The vehicle system according to claim 1, wherein the electronic control unit is configured to:
determine whether a state of the vehicle system is an abnormal state by comparing the second required position with the actual shift position, and
determine that the vehicle system is abnormal when a duration of the abnormal state is longer than or equal to a predetermined time.

* * * * *